US012626179B2

(12) United States Patent
Delay et al.

(10) Patent No.: US 12,626,179 B2
(45) Date of Patent: May 12, 2026

(54) SYSTEM AND METHODS FOR MONITORING MARINE VESSELS USING TOPIC MODEL TO DETERMINE PROBABILISTIC MARITIME SCENARIOS

(71) Applicant: EAGLE TECHNOLOGY, LLC, Melbourne, FL (US)

(72) Inventors: John L. Delay, Township, OH (US); Mark D. Rahmes, Melbourne, FL (US); David A. Mottarella, Melbourne, FL (US); Samer M. Abifaker, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 1242 days.

(21) Appl. No.: 16/454,299

(22) Filed: Jun. 27, 2019

(65) Prior Publication Data

US 2020/0410301 A1 Dec. 31, 2020

(51) Int. Cl.
*G06N 20/00* (2019.01)
*G06F 18/2415* (2023.01)
(Continued)

(52) U.S. Cl.
CPC ....... *G06N 20/00* (2019.01); *G06F 18/24155* (2023.01); *G06N 3/08* (2013.01);
(Continued)

(58) Field of Classification Search
CPC .. G06K 9/6278; G06K 9/6227; G06K 9/6292; G06N 3/08; G06N 7/005;
(Continued)

(56) References Cited

U.S. PATENT DOCUMENTS 9,715,495 B1 * 7/2017 Tacchi ................... G06F 40/30
10,200,113 B2 2/2019 Delay et al.
(Continued)

OTHER PUBLICATIONS

Fujino, Iwao, Christophe Claramunt, and Abdel-Ouahab Boudraa. "Extracting courses of vessels from AIS data and real-time warning against off-course." Proceedings of the 2nd International Conference on Big Data Research. 2018. https://dl.acm.org/doi/abs/10.1145/3291801.3291823 (Year: 2018).*
(Continued)

*Primary Examiner* — Michael H Hoang
(74) *Attorney, Agent, or Firm* — ALLEN, DYER, DOPPELT, GILCHRIST, P.A. Attorneys at Law

(57) ABSTRACT

A system is for monitoring marine vessels that generate automatic identification system (AIS) message data. The system may include a memory and a processor cooperating therewith to train a maritime scenario topic model using training textual data having known corresponding maritime scenarios associated therewith. The training textual data may include AIS message data. The processor operate the trained maritime scenario topic model on new textual data having unknown corresponding maritime scenarios to determine probabilistic maritime scenarios corresponding to the new textual data, where the new textual data includes new AIS message data. The processor may further generate an alert based upon the probabilistic maritime scenarios.

14 Claims, 6 Drawing Sheets

(51) Int. Cl.

| | |
|---|---|
| *G06N 3/08* | (2023.01) |
| *G06N 7/01* | (2023.01) |
| *G06Q 50/00* | (2024.01) |
| *G06V 20/13* | (2022.01) |
| *G08G 3/00* | (2006.01) |

(52) U.S. Cl.
CPC ................. *G06N 7/01* (2023.01); *G08G 3/00* (2013.01); *G06Q 50/01* (2013.01); *G06V 20/13* (2022.01)

(58) Field of Classification Search
CPC .......... G06N 3/02; G06N 5/003; G06N 20/00; G06N 5/022; G06N 3/0895; G06N 3/09; G06N 3/091; G06N 3/092; G06N 3/094; G06N 3/096; G06N 3/098; G06N 3/0985; G08G 3/00; G06Q 50/01; G06V 20/13
See application file for complete search history.

(56) References Cited

U.S. PATENT DOCUMENTS

| | | | |
|---|---|---|---|
| 2009/0161797 | A1 | 6/2009 | Cowles et al. |
| 2018/0089269 | A1 | 3/2018 | Pal et al. |
| 2018/0189229 | A1 | 7/2018 | Desoli et al. |
| 2018/0201348 | A1 | 7/2018 | Delay et al. |
| 2018/0203125 | A1 | 7/2018 | Delay et al. |
| 2018/0210883 | A1 | 7/2018 | Ang |
| 2019/0034436 | A1 | 1/2019 | Ottoson et al. |
| 2020/0175397 | A1* | 6/2020 | Wang .................... G06F 16/285 |

OTHER PUBLICATIONS

Asuncion, Arthur, et al. "On smoothing and inference for topic models." arXiv preprint arXiv:1205.2662 (2012). https://arxiv.org/abs/1205.2662 (Year: 2012).*

Chauhan, Nitin Kumar, and Krishna Singh. "A review on conventional machine learning vs deep learning." 2018 International conference on computing, power and communication technologies (GUCON). IEEE, 2018. https://ieeexplore.jeee.org/abstract/document/8675097 (Year: 2018).*

Rahmes, Mark, et al. "Near real time discovery and conversion of open source information to a reward matrix." WMSCI Dec. 2013 (2013). https://www.iiisci.org/Journal/pdv/sci/pdfs/SA554AD13.pdf (Year: 2013).*

Shin, Sung-Ho, et al. "Analyzing sustainability literature in maritime studies with text mining." Sustainability 10.10 (2018): 3522. https://www.mdpi.com/2071-1050/10/10/3522 (Year: 2018).*

Rubin, Timothy N., et al. "Statistical topic models for multi-label document classification." Machine learning 88.1 (2012): 157-208. https://link.springer.com/article/10.1007/s10994-011-5272-5 (Year: 2012).*

Le Guillarme, Nicolas, and Xavier Lerouvreur. "Unsupervised extraction of knowledge from S-AIS data for maritime situational awareness." Proceedings of the 16th International Conference on Information Fusion. IEEE, 2013. https://ieeexplore.ieee.org/abstract/document/6641255 (Year: 2013).*

Rahmes M, Chester D, Hunt J, Chiasson B. Optimizing cooperative cognitive search and rescue UAVs. InAutonomous systems: sensors, vehicles, security, and the internet of everything May 3, 2018 (vol. 10643, pp. 182-189). SPIE. (Year: 2018), https://www.spiedigitallibrary.org/conference-proceedings-of-spie/10643/106430T/Optimizing-cooperative-cognitive-search-and-rescue-UAVs/10.1117/12.2305928.full?SSO=1 (Year: 2018).*

Krüger, Max. "Experimental comparison of ad hoc methods for classification of maritime vessels based on real-life AIS data." 2018 21st International Conference on Information Fusion (Fusion). IEEE, 2018. https://ieeexplore.ieee.org/stamp/stamp.jsp?tp=&arnumber=8455362 (Year: 2018).*

Radon, Aungon Nag, et al. "Contextual verification for false alarm reduction in maritime anomaly detection." 2015 IEEE International Conference on Big Data (Big Data). IEEE, 2015. https://ieeexplore.ieee.org/stamp/stamp.jsp?tp=&arnumber=7363866 (Year: 2015).*

Lee, Kyong-Ha, Woo Lam Kang, and Young-Kyoon Suh. "Improving I/O Efficiency in Hadoop-Based Massive Data Analysis Programs." Scientific Programming 2018 (2018): 1-9. https://www.hindawi.com/journals/sp/2018/2682085/ (Year: 2018).*

Seera, N. K., and S. Taruna. "A Novel framework to optimize I/O cost in MapReduce: an index based solution." Procedia computer science 132 (2018): 1270-1279. https://www.sciencedirect.com/science/article/pii/S1877050918307750 (Year: 2018).*

Yang, Jie, and Ahm Mehbub Anwar. "Social Media Analysis on Evaluating Organisational Performance a Railway Service Management Context." 2016 IEEE 14th Intl Conf on Dependable, Autonomic and Secure Computing, 14th Intl Conf on Pervasive Intelligence and Computing, (Year: 2016), 2nd Intl Conf on Big Data Intelligence and Computing, 2nd Intl Conf on Big Data Intelligence and Computing and Cyber Science and Technology Congress (DASC/PiCom/DataCom/CyberSciTech). IEEE, 2016. https://ieeexplore.ieee.org/stamp/stamp.jsp?tp=&arnumber=7588941 (Year: 2016).*

Dong, H., Wang, W., Coenen, F. (2018). Learning Relations from Social Tagging Data. In: Geng, X., Kang, BH. (eds) PRICAI 2018: Trends in Artificial Intelligence. PRICAI 2018. Lecture Notes in Computer Science( ), vol. 11012. Springer, Cham. https:/ link.springer.com/chapter/10.1007/978-3-319-97304-3_3 (Year: 2018).*

U.S. Appl. No. 16/199,580, filed Nov. 26, 2018 Rahmes et al.

Anonymous "Amazon Redshift" https://aws.amazon.com/redshift/ Retrieved from internet Jun. 13, 2019; pp. 14.

Halme, A. "Common Situation Awareness as Basis for Human-Robot Interface" Climbing and Walking Robots: 2006; pp. 3-18. Abstract Only.

Nievas et al. "Violence detection in video using computer vision techniques" In CAIP: 2011 pp. 332-339. Abstract Only.

Marsden et al. "Resnetcrowd: A residual deep learning architecture for crowd counting, violent behaviour detection and crowd density level classification" https://arxiv.org/abs/1705.10698; pp. 7.

Preden et al. "Data exchange for shared situation awareness" IEEE; Mar. 2012. Abstract Only.

* cited by examiner

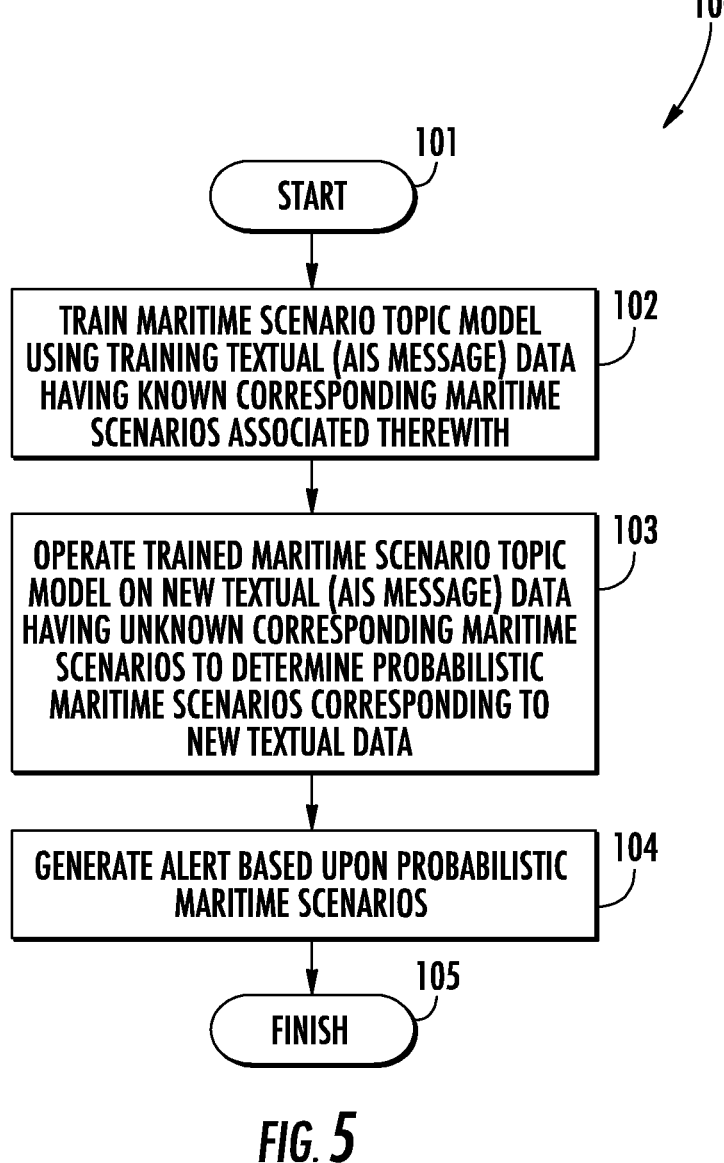

100

101 START

102 TRAIN MARITIME SCENARIO TOPIC MODEL USING TRAINING TEXTUAL (AIS MESSAGE) DATA HAVING KNOWN CORRESPONDING MARITIME SCENARIOS ASSOCIATED THEREWITH

103 OPERATE TRAINED MARITIME SCENARIO TOPIC MODEL ON NEW TEXTUAL (AIS MESSAGE) DATA HAVING UNKNOWN CORRESPONDING MARITIME SCENARIOS TO DETERMINE PROBABILISTIC MARITIME SCENARIOS CORRESPONDING TO NEW TEXTUAL DATA

104 GENERATE ALERT BASED UPON PROBABILISTIC MARITIME SCENARIOS

105 FINISH

*FIG. 5*

SYSTEM AND METHODS FOR MONITORING MARINE VESSELS USING TOPIC MODEL TO DETERMINE PROBABILISTIC MARITIME SCENARIOS

TECHNICAL FIELD

The present disclosure relates to marine vessel tracking systems, and, more particularly, to systems for monitoring marine vessels that send Automatic Identification System (AIS) signals and related methods.

BACKGROUND

The Automatic Identification System (AIS) is a tracking system for identifying and locating marine vessels by electronically exchanging data with other nearby vessels, AIS base stations, and satellites. AIS information may be used in conjunction with marine radar to help avoid collision with other vessels. AIS transmissions include information such as vessel identifiers, position, course, and speed. AIS not only allows oncoming vessels to know each other's locations, but it also allows maritime authorities to track and monitor vessel movements as well. AIS devices utilize information from satellite positioning systems (e.g., GPS), as well as other electronic navigation sensors, and communicate the AIS data via a very high frequency (VHF) transceiver.

U.S. Pat. Pub. No. 2009/0161797 to Cowles et al. discloses a system for detecting and decoding Automatic Identification System (AIS) signals which includes a plurality of orbital satellites. Each orbital satellite has at least one antenna with at least one antenna polarization for receiving a radio frequency signal. Each orbital satellite also has a communication module for accepting the radio frequency signal, converting the radio frequency signal into sampled packetized data for insertion into a raw data stream, inserting a plurality of signal parameters into the raw data stream, and transmitting the raw data stream and a telemetry data stream to at least one ground station. A processor located at the ground station receives and processes the raw data stream to identify one or more candidate AIS message signals.

Despite the existence of such systems, further advancements in marine vessel monitoring may be desirable in certain applications.

SUMMARY

A system is for monitoring marine vessels that generate automatic identification system (AIS) message data. The system may include a memory and a processor cooperating therewith to train a maritime scenario topic model using training textual data having known corresponding maritime scenarios associated therewith. The training textual data may comprise AIS message data. The processor may also operate the trained maritime scenario topic model on new textual data having unknown corresponding maritime scenarios to determine probabilistic maritime scenarios corresponding to the new textual data, where the new textual data includes new AIS message data. The processor may further generate an alert based upon the probabilistic maritime scenarios.

More particularly, the processor may train the maritime scenario topic model by generating topic vectors from the training textual data. For example, the processor may train the maritime scenario topic model further by performing singular value decomposition (SVD) on the topic vectors. Additionally, the processor may train the maritime scenario topic model further by determining correlation scores for the topic vectors using cosine similarity after performing SVD. Moreover, the processor may train the maritime scenario topic model further by performing an accuracy assessment of the topic vectors based upon the correlation scores using a receiver operating characteristic (ROC) curve.

In an example embodiment, the processor may operate the trained maritime scenario topic model based upon a thesaurus corresponding to maritime scenarios of interest. Additionally, the processor may train the maritime scenario topic model based upon a plurality of different classification models. By way of example, the plurality of different classification models may comprise at least some of nearest neighbor, Bayes, classification and prediction tree, multiple linear regression, and neural network models. Furthermore, the processor may use a reward matrix to select between the different classification models for the training textual data. In accordance with another example implementation, the processor may train the maritime scenario topic model also using open source social media data having known corresponding maritime scenarios associated therewith.

A related method is for monitoring marine vessels that generate AIS message data. The method may include training a maritime scenario topic model with a computer using training textual data having known corresponding maritime scenarios associated therewith, with the training textual data comprising AIS message data. The method may include operating the trained maritime scenario topic model with the computer on new textual data having unknown corresponding maritime scenarios to determine probabilistic maritime scenarios corresponding to the new textual data, where the new textual data includes new AIS message data. The method may further include generating an alert with the computer based upon the probabilistic maritime scenarios.

BRIEF DESCRIPTION OF THE DRAWINGS

FIGS. 5 and 6 are flow diagrams illustrating example method aspects associated with the system of FIG. 1.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
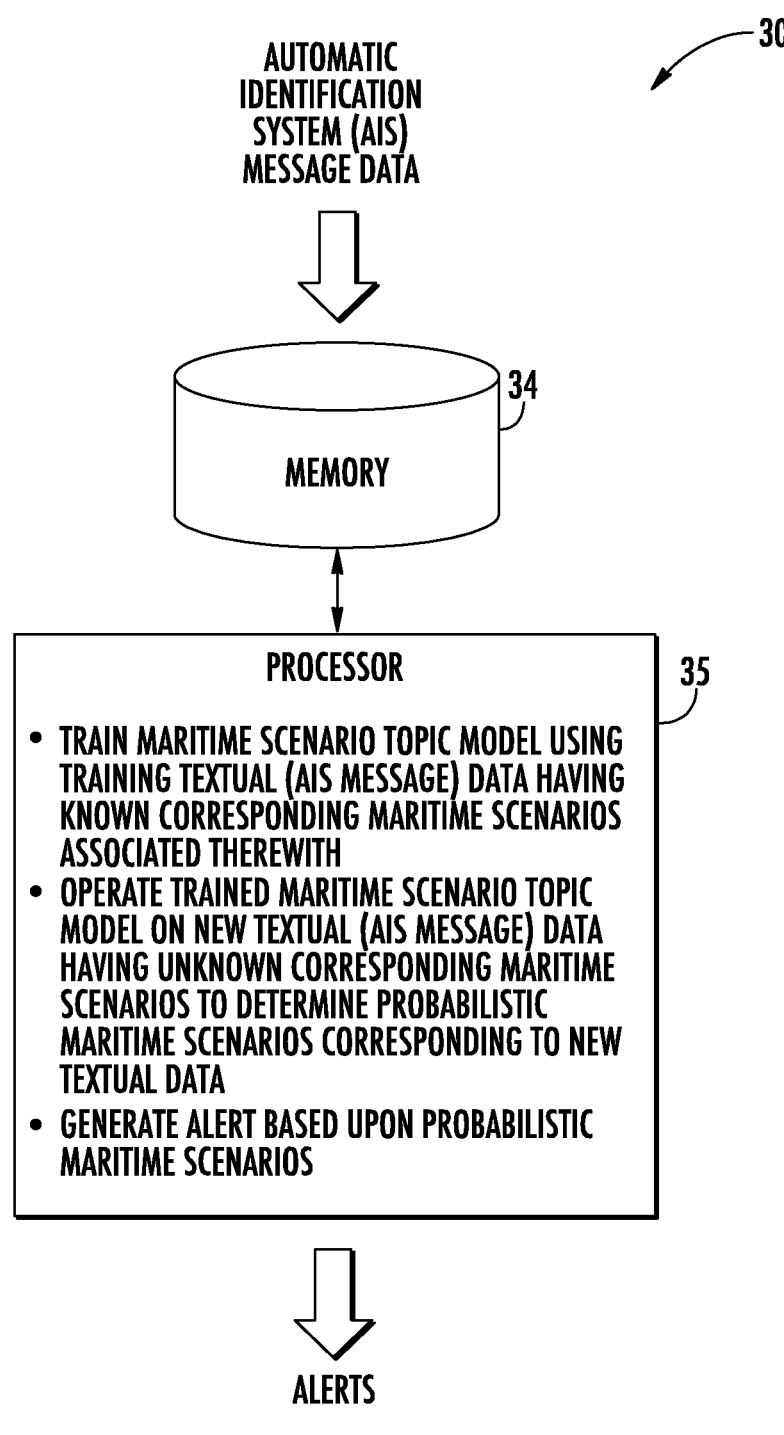
FIG. 1 is a schematic block diagram of a system for monitoring marine vessels that generates maritime scenario topic models based upon automatic identification system (AIS) data.
Figure 2:
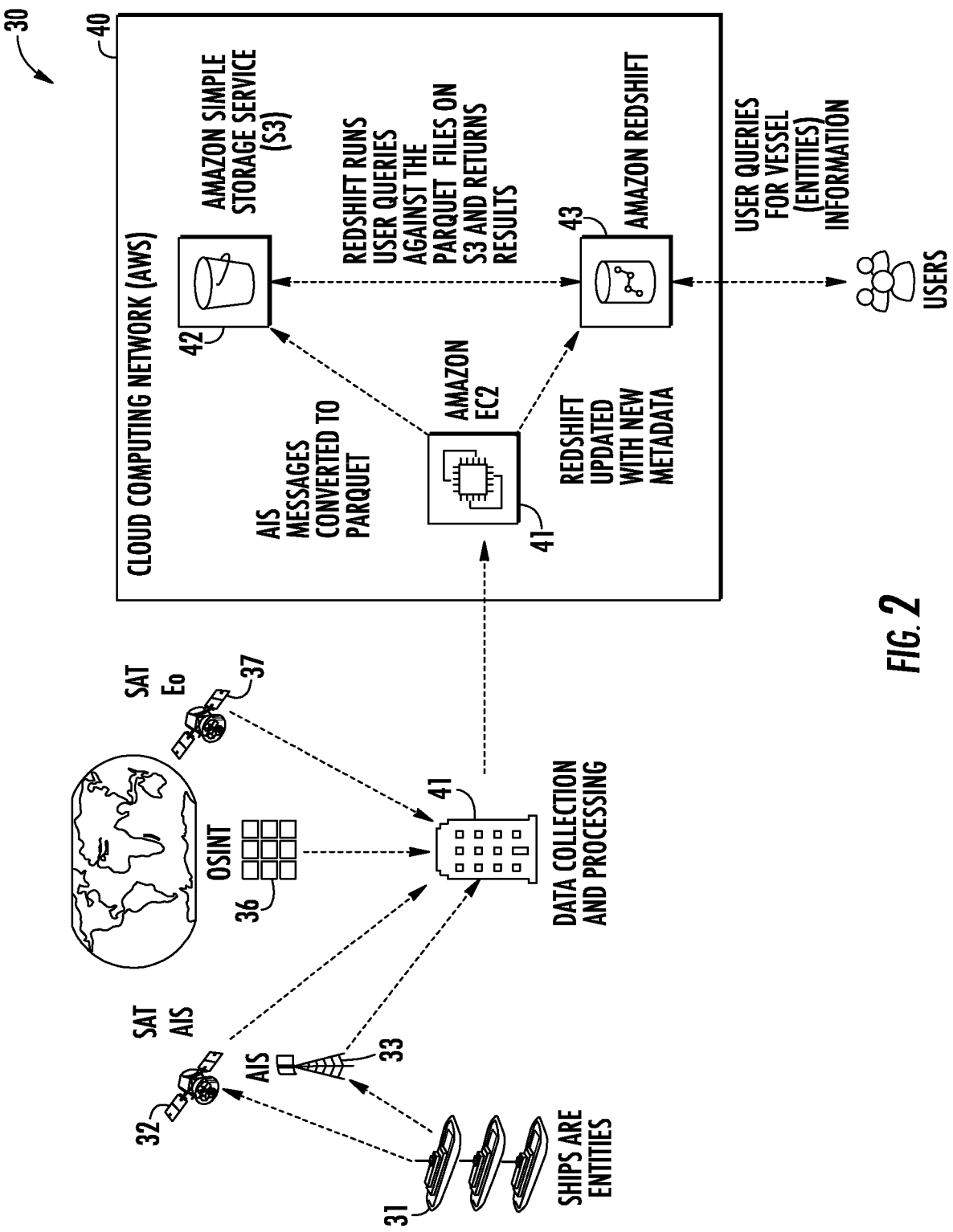
FIG. 2 is a schematic block diagram illustrating an example cloud computing implementation which may be used for the system of FIG. 1.

Referring initially to FIGS. 1-2 and the flow diagram 100 of FIG. 5, a system 30 for monitoring a plurality of marine vessels 31 that receives automatic identification system (AIS) data from a network of satellites 32 and/or land-based AIS stations 33 is first described. By way of background, there are many thousands of ships or vessels 31 moving around the world's oceans on any given day. It may be important for not only governments but also private entities to monitor marine vessel movements for a variety of reasons including geopolitical concerns, cargo theft, etc. As described above, the vessels 31 may transmit AIS data which may not only be received by nearby vessels and land-based stations 33, but also by the low-earth orbit satellites 32. By way of example, the satellites 32 may be part of the Iridium satellite constellation, although other types of satellites may be used in different embodiments.

Each satellite 32 may be equipped with a respective payload that includes a communications interface configured to communicate via the satellite network (e.g., via microwave communications), a radio frequency (RF) transceiver and associated antenna configured to communicate with the plurality of marine vessels to receive the AIS data therefrom. The satellite 32 may obtain automatic identification system (AIS) data including vessel position and call sign information, as well as message text, via the transceiver, and communicate the AIS system data via the communications interface through the satellite constellation to a terrestrial station, for example, where is it stored in a memory 34. As noted above, the satellite constellation may be the Iridium mobile communications satellite network, and the payloads may be attached to respective Iridium satellites, for example. That is, the communications interface may utilize the existing Iridium inter-satellite communications infrastructure used for communicating mobile device communications to also communicate the AIS data. However, other types of communications satellites or constellations may be used in different embodiments. Further details on AIS satellite communications may be found in U.S. Pat. No. 10,200, 113, which is assigned to the present Assignee and is hereby incorporated herein in its entirety by reference.

In addition to providing enhanced coverage for AIS monitoring while the marine vessels 31 are at sea where their VHF communications cannot be picked up by terrestrial AIS stations 33, the system 30 also advantageously provides for persistent surveillance capabilities resulting from the continuous and near real-time AIS data that is available throughout the voyage of a given marine vessel. One advantageous surveillance capability is to determine potential maritime scenarios that are happening with a given marine vessel 31, particularly when they are in remote areas away from port.

In this regard, the system 30 further illustratively a processor 35 cooperating with the memory 34. Beginning at Block 100, the processor 35 trains a maritime scenario topic model using training textual data having known corresponding maritime scenarios associated therewith, at Block 102. More particularly, the training textual data includes AIS message data, including various meta data and message data. In some embodiments the training textual data may optionally include open source internet (OSINT) data 36, such as social media data, for example, as shown in FIG. 2. For example, the OSINT data 36 may be data that is generated or consumed by people on the ships 31. Open source data is readily available and may be processed to extract valuable intelligence information using cognitive reasoning for evaluating situational awareness with persistent activity based surveillance, as will be discussed further below.

The processor 35 may further operate the trained maritime scenario topic model on new textual data having unknown corresponding maritime scenarios to determine probabilistic maritime scenarios corresponding to the new textual data, at Block 103. Here again, the new textual data includes new AIS message data (and, optionally, also OSINT data 36).

The processor 35 may then advantageously generate an alert as appropriate based upon the probabilistic maritime scenarios, at Block 104, which illustratively concludes the method of FIG. 5 (Block 105).

Example maritime scenarios that the marine vessels 31 may be involved include drilling, dumping, spoofing, loitering (rendezvous), trans-shipping, co-traveling, diverting, cargo exchange, maintenance problems, distress, etc. These scenarios or conditions may be of interest to numerous different types of entities, including: maritime security (for unusual/illegal behavior); search and rescue (for state of emergency/location); port authorities (for arrival time, etc.); customs (for unusual cargo or behaviors); insurers (for unnecessary risks or unplanned routes); environmental agencies (for emissions/travel through protected waters); commodities traders (for source and/or value of cargo); and ship owners (for length or journey/ship status/final destination), etc.

Monitoring such scenarios becomes increasingly important in view of global instability, geopolitical concerns, humanitarian crises/natural disasters, and resource scarcity/contention, for example. However, the system 30 may advantageously apply self-learning knowledge graphs with artificial intelligence/machine learning and topic modeling to extract relevant information across large volumes of meta data, so that unstructured data may be applied to a diverse set of intelligence problems. Moreover, the system 30 may also advantageously access increasingly relevant open source and commercial data, and optionally leverage persistent national and commercial imagery sources to find "bad actors" or other scenarios of interest (including safety/search and rescue scenarios)

In the implementation shown in FIG. 2, the processor 35 is implemented within a cloud computing network 40. In the illustrated example, this is Amazon Web Services (AWS), although other cloud computing services may also be used in different embodiments. The AIS data from satellites 32 and land-based stations 33, OSINT data 36, and/or optical (image) data from electro-optical (EO) imaging satellites 37 may be provided to one or more data collection/processing centers 41, and then to the cloud computing network 40 for topic model processing as discussed further below. In the illustrated example, the data is received through the Amazon Elastic Compute Cloud (EC2) 41, a web service that provides secure, resizable compute capacity in the cloud. The EC2 41 converts AIS messages to Parquet and provides them to the Amazon Simple Storage Service (S3), and provide AIS metadata updates to Amazon Redshift 43. Amazon Redshift is an Internet hosting service and data warehouse product that handles large scale data sets and database migrations. In the illustrated implementation, Redshift 43 issues user queries against the Parquet files in S3 42 and returns the appropriate results.

The topic model processing operations which may be performed within this cloud computing network architecture are discussed further below, but it should be noted that implementation of the system 30 within a cloud computing network 40 advantageously leverages cloud computing resources to collect, manage and process the large volumes of persistent AIS, and optional OSINT/imagery, data used for the topic model formation and comparison operations. Moreover, in the example cloud implementation each entity becomes a persistent (temporal) collection of metadata including topic driven analyses to enrich entities and increase the ability to accurately predict vessel 31 behaviors. Nevertheless, the system 30 need not always be implemented in a cloud configuration, and in some embodiments may instead be performed using dedicated servers/data centers.

Through the use of topic modeling, the system 30 is better able to predict ship 31 behavior, and identify certain behaviors of interest by leveraging current algorithms against unstructured data to mathematically represent a situational awareness scenario which can be correlated with AIS to numerous scenarios. Among others, these may include: detecting ships which turn off and spoof AIS data, bad actors transporting prohibited goods, illegal trafficking, etc.; identifying a network of actors using topic modeling to predict and detect rendezvous of ships who are part of a network of actors associated with a given topic; and predicting, tipping and cueing to protect against bad actors and track them from multiple simultaneous ships and ports of origin for intercept.

By leveraging S3+Parquet+Redshift in the AWS Data warehouse (or other suitable cloud computing network configurations in other embodiments), the system 30 may advantageously query any timeframe of AIS data in a performant manner. A Parquet file is a binary data file in which the data is stored in a columnar format. Columnar formats (as opposed to traditional row formats) are generally better suited for queries requiring OLAP (On-line Analytical Processing) and aggregation. A data lake may be used for this application, which is a centralized repository that allows data storage at essentially any scale. It will be appreciated that years of AIS messages account for billions of records and terabytes of data, so by using AWS S3 as a data lake (or other suitable system), all of this data may be stored without concerns of hitting storage limitations.

Figure 3:
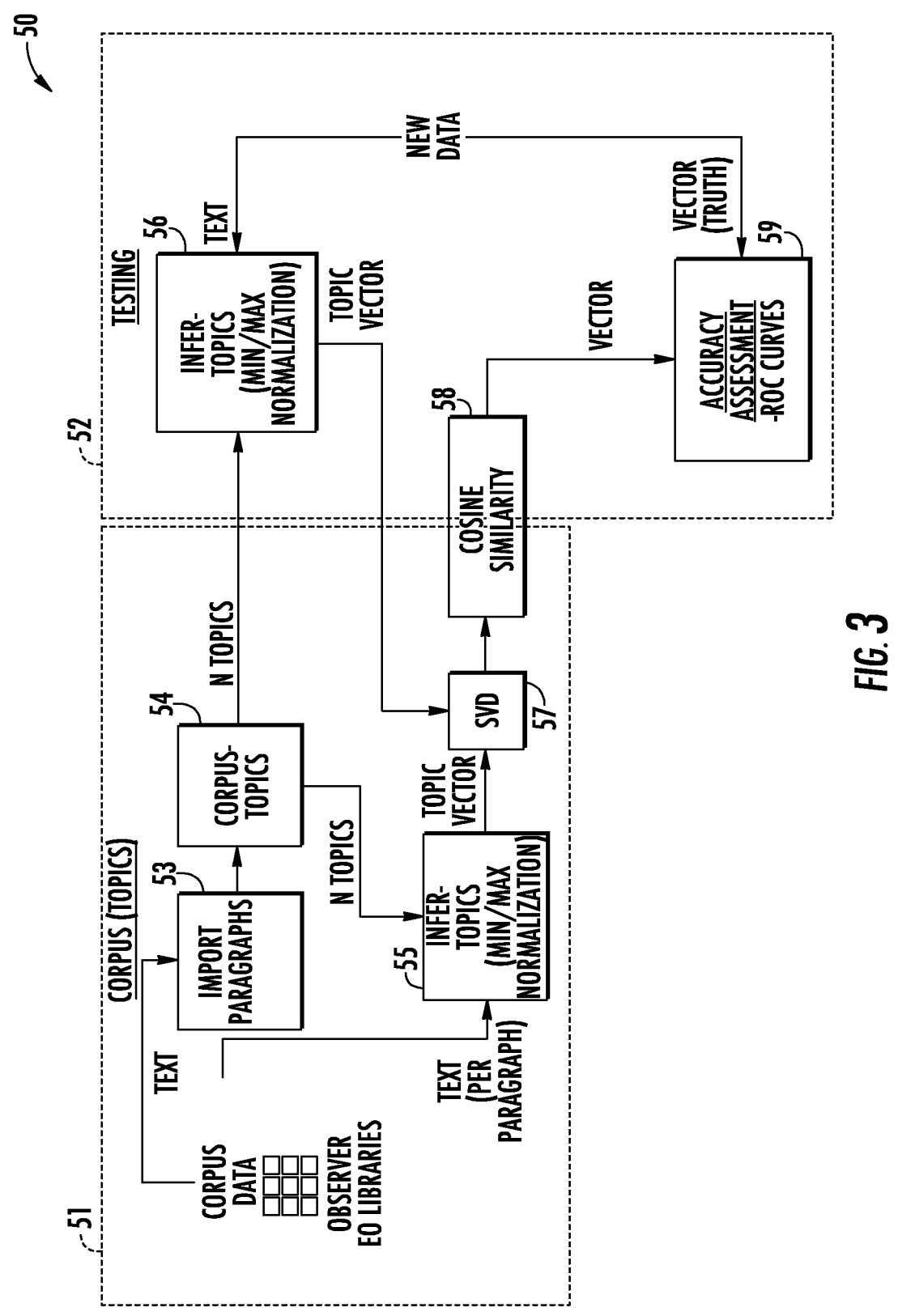
FIG. 3 is a schematic block diagram illustrating example components which may be incorporated in the system of FIG. 1 for training a maritime scenario topic model.

Referring additionally to FIG. 3, an example topic model training system 50 that may be implemented by the processor 35 is now described. The system 50 illustratively includes a corpus (topics) section 51, and a testing or training section 52. The corpus section 51 ingests corpus (training) data including AIS message data, open source (e.g., social media) data, imagery (EO) data, etc. having known maritime scenarios associated therewith. In an example implementation some of this corpus data may be provided by IntelliEarth™ Mission Services, IntelliEarth™ Geospatial Data Solutions, as well as Airborne Remote Sensing Solutions from Harris Corp. of Melbourne, Florida, although other suitable data sources may also be used in different embodiments.

Corpus text data is provided to a paragraph import module 53, the output of which is received by a corpus topics module 54. By way of example, the corpus topics module 54 may apply Natural Language Processing (NLP) to identify verbs (activity), names, locations, and organizations in the corpus data. Generally speaking, NLP performs better than a simple matching of a word list, as it identifies parts of speech and entities from the grammatical context. However, other suitable text recognition approaches may also be used in different embodiments.

The topics identified by the corpus topics module 54 (N topics in the present example) are provided to a first infer topics module 55 in the corpus section 51, and also to a second infer topics module 56 in the testing section 52. The first infer topic module 55 further receives as input the corpus text data (per paragraph), while the second infer topics module 56 receives new textual data to be compared with the N topics. Generally speaking, the first and second infer topics modules 55, 56 perform min/max normalization on, and determine topic vectors from, the topics identified by the corpus topics module 54. This may be done using one or more classification/prediction models, such as: k-nearest neighbor; naïve Bayes; classification and prediction trees; multiple linear regression; logistic regression; and neural networks. More particularly, different classification models may perform better in different scenarios. The first and second infer topics modules 55, 56 may also employ artificial intelligence/machine learning techniques to correlate locations of interest with E0 and AIS sources.

In some embodiments, the infer topics modules 55, 56 may employ game theory to select the best model for any given observation. Game theory is the study of strategic decision-making and mathematical modeling of conflict and cooperation between intelligent, rational decision-makers, and is often thought of as an interactive decision theory. Modern game theory began with the idea of the existence of mixed-strategy equilibrium in two-person zero-sum games, applied to economics. Later, this evolved to provide a theory of expected utility, which allowed mathematicians and economists to treat decision making with uncertainty. The notion of probabilistic predictions utilizing game theory is important to many decision making applications because optimizing user experience requires being able to compute expected utilities of mutually exclusive data.

Figure 6:
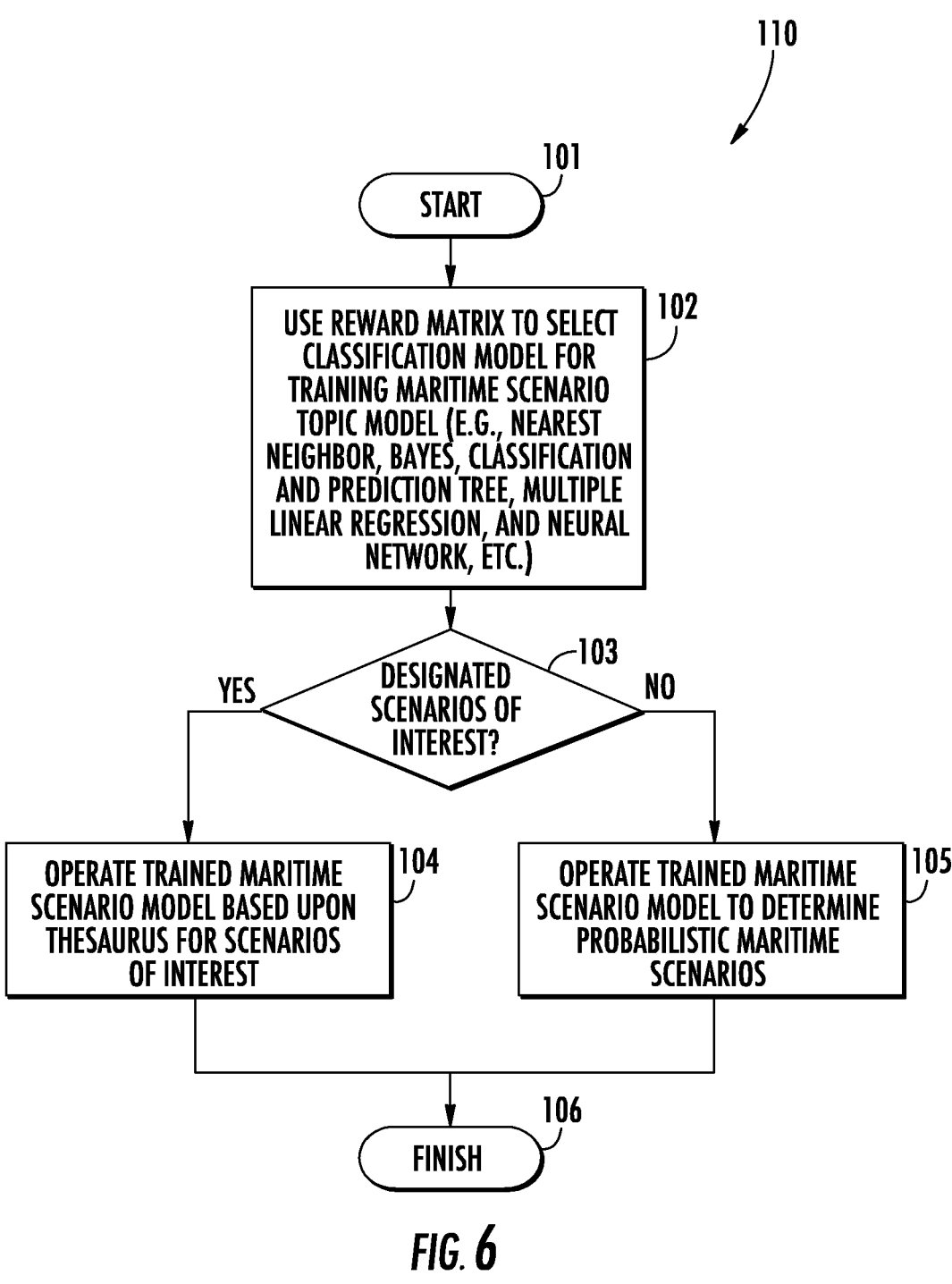

Referring additionally to the flow diagram 110 of FIG. 6, beginning at Block 101, an example game theory implementation may use linear programming to define a topic vector decision or "reward" matrix (Block 102). A genetic algorithm may be combined with the linear programming to create an enhanced game theory-based decision algorithm, in which the genetics portion of the algorithm is handled with an iterative process. Further details on this example game theory approach may be found in U.S. application Ser. No. 16/199,580, which is assigned to the present Applicant and hereby incorporated herein in its entirety by reference.

The topic vectors generated by the first infer topics module 55 are provided to a singular value decomposition (SVD) module 57. Furthermore, a correlation of the results of the SVD module 57 may be performed by a cosine similarity module 58 to determine correlation scores for the different topic vectors. The cosine similarity scores are output as vectors to an accuracy assessment module 59, which also receives topic vectors output by the second infer topics module 56 as truth vectors. The accuracy assessment module 59 may utilize receiver operating characteristic (ROC) curves or other approaches for determining the accuracy of the various topic vectors for training purposes.

This training approach may advantageously allow an analyst to select or define a topic vector to any number of bad actor (or other) scenarios. Moreover, it provides a scalable, modular enterprise tool which adds topics to be used to tip and cue collection and/or monitoring of other data sources (e.g., imagery, aerial surveillance, etc.) against potential bad actors, etc. That is, the system 30 may advantageously search for similar, threat, or high value topic scenarios from historical archives of data.

In some example embodiments, it may be desirable to monitor for specific scenarios of interest, rather than generally monitor all of the scenarios that are happening with one or more of the vessels 31. In such cases, a thesaurus may be used to define topic vectors of interest, and the trained maritime scenario model may be operated based upon this thesaurus accordingly, at Blocks 103-104. Otherwise, the trained maritime scenario model may be operated to generally monitor what is happening (good or bad) with one or more of the vessels 31, at Block 105, which illustratively concludes the method of FIG. 6 (Block 106).

Figure 4:
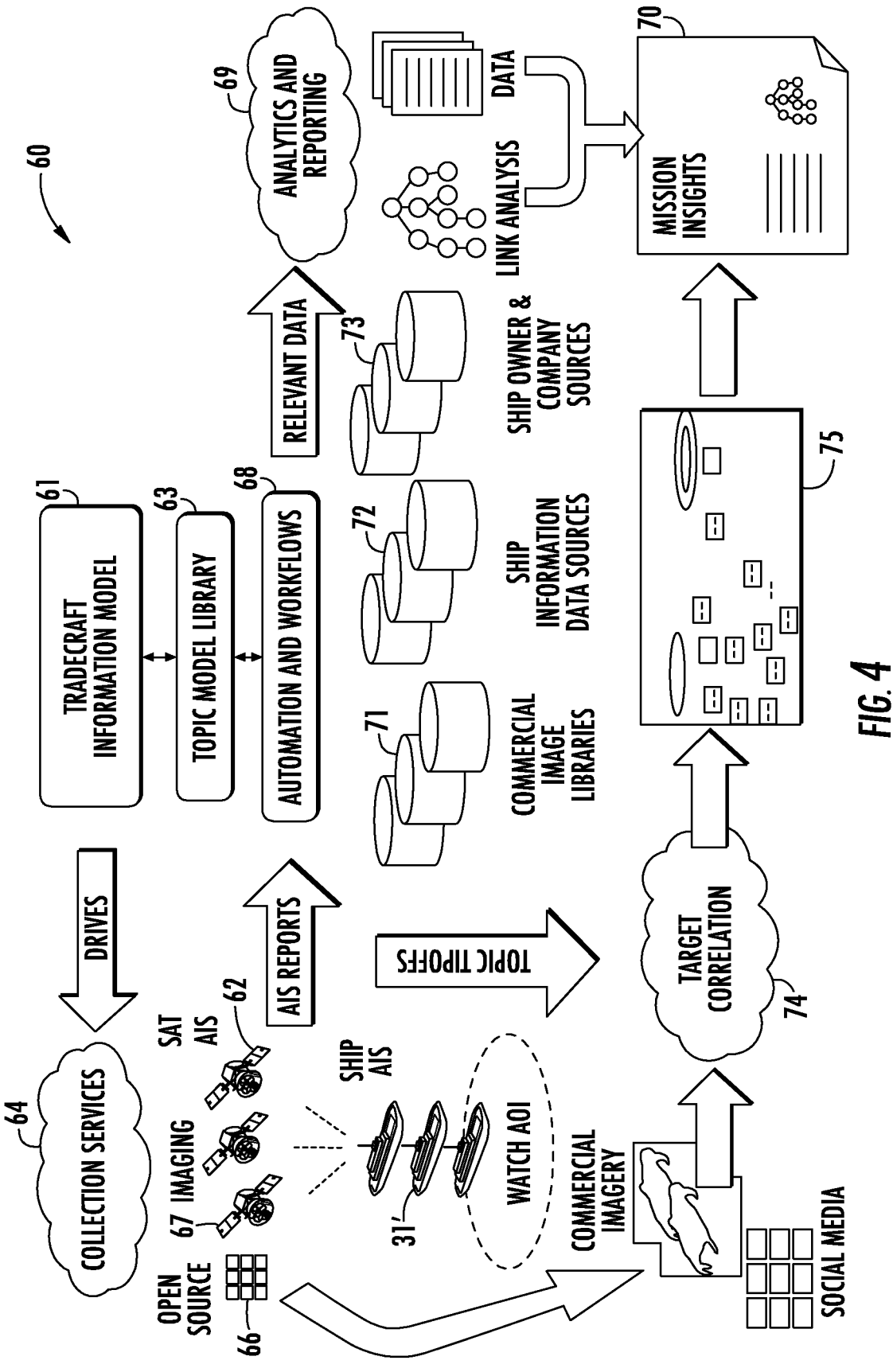
FIG. 4 is a schematic block diagram showing an example implementation of the system of FIG. 1.

Turning now to FIG. 4, an example implementation is shown in which a system 60 illustratively includes a tradecraft information model 61 (which may include a thesaurus for topics of particular interest) cooperates with a topic model library 63 (which may be created through the above-described training process, for example) to drive various collection services 64 such as satellite AIS collection sources 32, imagery sources 67, open source data sources 66, etc. AIS reports (and optionally other data) are provided to an automation and workflows module 68 to perform the above-described topic modeling operations, which provides relevant data to an analytics/reporting module 69 to generate the link analyses and data that may be incorporated into mission insight reports 70. The automation and workflows module 68 may further cooperate with data sources such as commercial image libraries 71, ship information data libraries 72, ship owner and company libraries 73, etc. as appropriate. Furthermore, the commercial imagery and/or social media (open source) data may also be correlated with topic tipoffs at a target correlation module 74 for target identification (as represented by the square boxes around ships in the display 75), and this information may further be incorporated into the mission insight reports 70. As noted above, one or more of these components may be implemented within a cloud computing network in some embodiments.

It will be appreciated that finding bad actors or other specific maritime scenario occurrences with a single phenomenology may be challenging. With the use of persistent global maritime coverage, such as through the Harris AIS SeaSmart Collection services from Harris Corp., the systems 30, 60 advantageously allow for topic models to be used to provide more accurate predictions of ship behavior. Moreover, it may also allow for the identification of target behaviors by leveraging current algorithms against unstructured data to mathematically represent a situational awareness scenario which may be correlated with AIS data to: detect ships which turn off and spoof AIS data, bad actors doing arms transport, illegal trafficking, etc.; identify a network of actors using topic modeling to predict and detect rendezvous of ships who are part of a network of actors associated with a given topic; and predict, tip and cue to collect information about bad actors and track them from multiple simultaneous ships and ports of origin for intercept.

The SeaSmart ship registries treat ships as entities which may be persistently tracked on a global basis. Furthermore, AIS may be used to isolate bad actors on global scale in the maritime domain, and using the above described topic modeling may advantageously increase the value or usefulness of AIS data through proper correlation of the otherwise disparate information. Moreover, open source data is readily available and may be processed to extract valuable intelligence information and further enhance the accuracy of the topic modeling operations.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for monitoring marine vessels that generate automatic identification system (AIS) message data, the system comprising:

a memory and a processor cooperating therewith to
process open source internet (OSINT) data from a plurality of different sources generated or consumed by passengers on the marine vessels to extract OSINT topic vectors therefrom correlated with at least one location of interest using a first infer topics module applying min/max normalization, and store the OSINT topic vectors in a columnar format in at least one binary data file within a data lake, process AIS message data from the marine vessels to extract AIS topic vectors therefrom correlated with the at least one location of interest using a second infer topics module applying min/max normalization, and store the AIS topic vectors in the columnar format in the at least one binary data file within the data lake, query the OSINT topic vectors and the AIS topic vectors from the at least one binary data file using on-line analytical processing (OLAP) and aggregation, operate an accuracy assessment module to train a maritime scenario topic model based upon a game theoretic optimization using a reward matrix to select between a plurality of different classification models using training textual data having known corresponding maritime scenarios associated therewith, the training textual data comprising the AIS topic vectors and the OSINT topic vectors, the accuracy assessment module performing the training to an accuracy level based upon an accuracy assessment of the topic vectors relative to truth topic vectors using a receiver operating characteristic (ROC) curve, operate the trained maritime scenario topic model on new textual data comprising OSINT topic vectors and AIS message vectors having unknown corresponding maritime scenarios to determine probabilistic maritime scenarios corresponding to the new textual data, the new textual data comprising new AIS topic vectors and the OSINT topic vectors, and generate an alert based upon the probabilistic maritime scenarios.

2. The system of claim 1 wherein the accuracy assessment module performs the training further by performing singular value decomposition (SVD) on the topic vectors.

3. The system of claim 2 wherein the accuracy assessment module performs the training further by determining correlation scores for the topic vectors using cosine similarity after performing SVD.

4. The system of claim 3 wherein the accuracy assessment module performs the training further by performing an accuracy assessment of the topic vectors based upon the correlation scores using the ROC curve.

5. The system of claim 1 wherein the processor operates the trained maritime scenario topic model based upon a thesaurus corresponding to maritime scenarios of interest.

6. The system of claim 1 wherein the plurality of different classification models comprises at least some of nearest neighbor, Bayes, classification and prediction tree, multiple linear regression, and neural network models.

7. A system for monitoring marine vessels that generate automatic identification system (AIS) message data, the system comprising:

a memory and a processor cooperating therewith to
process open source internet (OSINT) data from a plurality of different sources generated or consumed by passengers on the marine vessels to extract OSINT topic vectors therefrom correlated with at least one location of interest using a first infer topics module applying min/max normalization, and store the OSINT topic vectors in a columnar format in at least one binary data file within a data lake, process AIS message data from the marine vessels to extract AIS topic vectors therefrom correlated with the at least one location of interest using a second infer topics module applying min/max normalization, and store the AIS topic vectors in the columnar format in the at least one binary data file within the data lake, query the OSINT topic vectors and the AIS topic vectors from the at least one binary data file using on-line analytical processing (OLAP) and aggregation, operate an accuracy assessment module to train a maritime scenario topic model based upon a game theoretic optimization using a reward matrix to select between a plurality of different classification models from the training textual data generated using singular value decomposition (SVD) AIS topic vectors and OSINT topic vectors having known corresponding maritime scenarios associated therewith, the accuracy assessment module performing the training to an accuracy level based upon an accuracy assessment of the topic vectors relative to truth topic vectors using a receiver operating characteristic (ROC) curve, operate the trained maritime scenario topic model on new textual data comprising OSINT topic vectors and AIS message vectors having unknown corresponding maritime scenarios based upon a thesaurus corresponding to maritime scenarios of interest to determine probabilistic maritime scenarios of interest corresponding to the new textual data, the new textual data comprising new AIS topic vectors and the OSINT topic vectors, and generate an alert based upon the probabilistic maritime scenarios.

8. The system of claim 7 wherein the accuracy assessment module performs the training further by determining correlation scores for the topic vectors using cosine similarity after performing SVD.

9. The system of claim 7 wherein the processor trains the maritime scenario topic model based upon a plurality of different classification models comprising at least some of nearest neighbor, Bayes, classification and prediction tree, multiple linear regression, and neural network models.

10. A method for monitoring marine vessels that generate automatic identification system (AIS) message data, the method comprising:

processing open source internet (OSINT) data from a plurality of different sources generated or consumed by passengers on the marine vessels to extract OSINT topic vectors therefrom correlated with at least one location of interest using a first infer topics module applying min/max normalization, and store the OSINT topic vectors in a columnar format in at least one binary data file within a data lake, using a computer, processing AIS message data from the marine vessels to extract AIS topic vectors therefrom correlated with the at least one location of interest using a second infer topics module applying min/max normalization, and storing the AIS topic vectors in the columnar format in the at least one binary data file within the data lake, using the computer, querying the OSINT topic vectors and the AIS topic vectors from the at least one binary data file using on-line analytical processing (OLAP) and aggregation, operating an accuracy assessment module for training a maritime scenario topic model with the computer based upon a game theoretic optimization using a reward matrix to select between a plurality of different classification models using training textual data having known corresponding maritime scenarios associated therewith, the training textual data comprising the AIS topic vectors and the OSINT topic vectors, the accuracy assessment module performing the training to an accuracy level based upon an accuracy assessment of the topic vectors relative to truth topic vectors using a receiver operating characteristic (ROC) curve;

operating the trained maritime scenario topic model with the computer on new textual data comprising OSINT topic vectors and AIS message vectors having unknown corresponding maritime scenarios to determine probabilistic maritime scenarios corresponding to the new textual data, the new textual data comprising new AIS topic vectors and the OSINT topic vectors; and generating an alert with the computer based upon the probabilistic maritime scenarios.

11. The method of claim 10 wherein operating the accuracy assessment module further comprises operating the accuracy assessment module for performing singular value decomposition (SVD) on the topic vectors.

12. The method of claim 11 wherein operating the accuracy assessment module further comprises operating the accuracy assessment module for determining correlation scores for the topic vectors using cosine similarity after performing SVD.

13. The method of claim 10 wherein operating the trained maritime scenario topic model comprises operating the trained maritime scenario topic model based upon a thesaurus corresponding to maritime scenarios of interest.

14. The method of claim 10 wherein operating the maritime scenario topic model comprises operating the trained maritime scenario topic model based upon a plurality of different classification models comprising at least some of nearest neighbor, Bayes, classification and prediction tree, multiple linear regression, and neural network models.

* * * * *